(No Model.)
W. T. WHITE.
TRAWL LINE.
No. 523,561. Patented July 24, 1894.
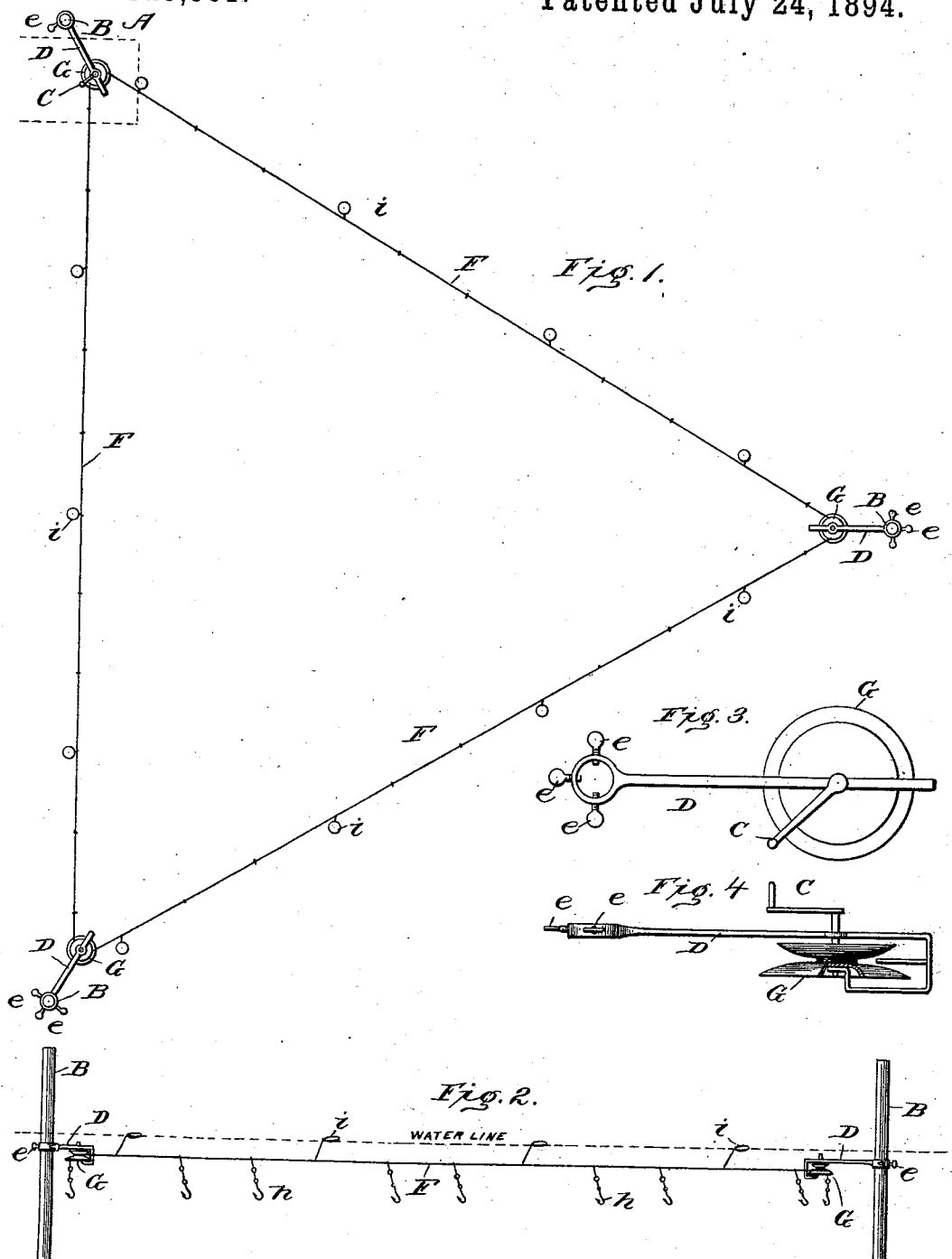
Witnesses
Edwin L. Bradford
Alfred J. O'Farrell
Inventor
Warren T. White
By Patrick O'Farrell
Attorney

UNITED STATES PATENT OFFICE.

WARREN THOMAS WHITE, OF BONHAM, TEXAS, ASSIGNOR OF ONE-THIRD TO LUSK & THURMOND.

TRAWL-LINE.

SPECIFICATION forming part of Letters Patent No. 523,561, dated July 24, 1894.

Application filed January 14, 1893. Serial No. 458,330. (No model.)

*To all whom it may concern:*

Be it known that I, WARREN THOMAS WHITE, a citizen of the United States of America, residing at Bonham, in the county of Fannin and State of Texas, have invented certain new and useful Improvements in Trawl-Lines, of which the following is a specification, reference being had therein to the accompanying drawings.

This invention relates to trawl-lines, for fishing, especially, to the means for supporting the line whereby it can be caused to travel continuously in the same or reversed directions at will.

The purpose of the invention is to prevent the choking of the line supporting pulleys with grasses and other foreign matter, and also to enable the ready adjustment of the pulleys on the posts to change the elevation of the trawl-line and the depth of dip of the hooks in the water.

The improvements consist essentially of a guard attached to the pulley frame and projecting into the groove of the pulley at a point diametrically opposite the bight of the trawl-line, and in a ring or cuff at the end of the pulley frame provided with a series of binding screws to adjustably connect the pulley frame with the post.

The improvement also consists of the novel features which hereinafter will be more fully described and claimed and which are shown in the amended drawings, in which—

Figure 1, is a plan view of the invention showing the trawl-line supported on three posts. Fig. 2, is a side elevation of the invention showing the trawl-line supported on two posts. Fig. 3, is a top plan view of the pulley shown on a larger scale. Fig. 4, is a side view of the pulley illustrated in Fig. 3, a portion of the pulley being broken away to show the lower bearing. Fig. 5, is a modified form of pulley showing the outer end of pulley frame bent down.

The pulleys G are grooved, the lower portion being of larger diameter to support the trawl-line F. The frames D have parallel portions at one end between which the pulleys G are journaled, the lower portion having its end I bent up at right angles for a short distance and outward to receive the lower journal of the pulley, see Fig. 4. The ring or cuff E at the opposite end of the frames is provided with a series of binding screws e by means of which the pulley frames are adjustably secured to the posts. A guard A' attached to the closed end of the frame and extending parallel with the aforesaid parallel portions thereof, projects into the groove of the pulley a sufficient distance to remove grass and other foreign matter and prevent the same from choking up the pulley.

The trawl-line F is endless and is provided with hooks h and the floats i in desired numbers and properly spaced. This line passes around the pulleys and is caused to travel by being operated by hand or by turning one of the pulleys by means of a crank C.

A station A, as indicated by the dotted lines in Fig. 1, may be provided for the protection and convenience of the fisherman and protects one of the posts.

The number of posts is not material to the spirit of the invention. In Fig. 2, two are shown and in Fig. 1, three.

The pulleys are horizontally disposed and located in practically the same place so that the different parts of the trawl-line will occupy the same level. By moving the pulleys on the posts the line can be raised or lowered as required.

In Fig. 5, the outer end of the pulley frame is shown bent down at H thereby enabling the inner end to be attached to the posts above the water level.

I claim—

1. A fishing tackle composed of posts set in the water, frames having cuffs at one end to embrace a post and having binding screws passing laterally through the said cuffs to adjustably connect the frames with the said posts, and having horizontal pulleys at the opposite ends, and a trawl-line passing around and supported by the said pulleys, substantially as described.

2. In a fishing tackle the combination with posts set in the water, of pulley frames adjustably connected at one end respectively with the said posts and having parallel portions at the opposite ends between which groove pulleys are journaled, a guard connected with the closed ends of the frames and extending into the grooves of the pulleys for the purpose set forth, and a trawl-line passing around and supported by the said pulley, substantially as described.

In testimony whereof I affix my signature in presence of two witnesses.

WARREN THOMAS WHITE.

Witnesses:
S. J. HAMPTON,
R. H. TAYLOR.